ND COMPOUND

United States Patent [19]
Bruls et al.

[11] Patent Number: 4,661,545
[45] Date of Patent: Apr. 28, 1987

[54] THERMOPLASTIC MOULDING COMPOUND

[75] Inventors: Wilhelmus G. M. Bruls, Geulle; Eize Roerdink, Beek, both of Netherlands

[73] Assignee: Stamicarbon B.V. (Licensing subsidiary of DSM), Geleen, Netherlands

[21] Appl. No.: 793,344

[22] Filed: Oct. 31, 1985

[30] Foreign Application Priority Data

Nov. 15, 1984 [NL] Netherlands .................. 8403489

[51] Int. Cl.$^4$ ........................... C08K 5/51; C08K 5/52
[52] U.S. Cl. ................................. 524/147; 524/151; 524/152; 524/153; 524/414; 524/559
[58] Field of Search ............... 524/147, 151, 152, 153, 524/414, 559

[56] References Cited

U.S. PATENT DOCUMENTS

| | | | |
|---|---|---|---|
| 3,402,142 | 9/1968 | Follett | 524/147 |
| 3,794,616 | 2/1974 | Dennis et al. | 524/414 |
| 4,129,553 | 12/1978 | Haberlien et al. | 524/152 |
| 4,321,218 | 3/1982 | Rasberger et al. | 524/151 |

FOREIGN PATENT DOCUMENTS 54-39455  3/1979  Japan ................... 524/151

*Primary Examiner*—Lewis T. Jacobs
*Attorney, Agent, or Firm*—Cushman, Darby & Cushman

[57] ABSTRACT

The invention relates to a thermoplastic moulding compound consisting of:
A. at least 95% (wt) of a copolymer consisting of
  1. 50–95 moles % styrene and/or α-methylstyrene
  2. 50–55 moles % unsaturated dicarboxylic anhydride
B. at most 5% (wt) of an phosphite with the general formula of

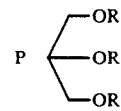

where R represents hydrogen or the residue of an alkyl, cycloalkyl, aryl, alkaryl or aralkyl, while the R substituents need not to be the same and may contain heteroatoms.

It has been found that additions of these phosphites to SMA-containing moulding compounds checks the decomposition of SMA, prevents the moulding compound from getting stuck to the processing equipment and consequently reduces corrosion to a high degree.

14 Claims, No Drawings

THERMOPLASTIC MOULDING COMPOUND

FIELD OF THE INVENTION

The invention relates to a thermoplastic moulding compound based on a copolymer of an alkenyl-aromatic monomer and an unsaturated dicarboxylic anhydride.

BACKGROUND OF THE INVENTION

Copolymers from alkenyl-aromatic monomers and unsaturated dicarboxylic anhydrides are known in the art. Examples of these copolymers are the copolymers from styrene and maleic anhydride (SMA). The preparation of these copolymers can be effected via batch processes as well as continuous processes. The first few commercial SMA copolymers were low-molecular products with molecular weights lower than 5000. These grades were used in, for instance, floor shampoos, floor waxes, emulsion paints and dispersants.

In addition to these low-molecular products there are also high-molecular SMA copolymers. These are important in, for instance, the automotive industry and in domestic articles.

Copolymers of styrene and/or α-methylstyrene and maleic anhydride are usually prepared according to processes customary for, for instance, mass polymerization or solution polymerization. Thus copolymers of styrene and maleic anhydride can be obtained, for instance, according to U.S. Pat. No. 2,971,939 by reacting the two monomers, styrene and maleic anhydride, with each other in the presence of a peroxide. The polymerization can be better controlled while using a solvent, for instance methyl ethyl ketone, acetone, xylene, dioxane, ethylbenzene, dimethylformamide or toluene.

A 50:50 (molar)-copolymer can be obtained by batchwise copolymerization of styrene and maleic anhydride, for instance by precipitation polymerization of styrene and maleic anhydride in aromatic solvents. Copolymers containing less maleic anhydride can be obtained if in a continuous polymerization process a mixture of much styrene and little maleic anhydride is introduced into a polymerization vessel at high temperature while being stirred firmly with simultaneous removal of the same amount of the polymerization mixture from the vessel (A. W. Hanson and R. L. Zimmerman, Industrial Engineering Chemistry 49, page 1803, 1957).

High-molecular SMA polymers can be processed by means of extrusion and injection moulding. The theoretical upper limit of the MA content is 50 moles % (alternating copolymers). Owing to the high softening point (220° C.), the processing characteristics of these products, however, are poor.

Moreover at the high processing temperature thermal breakdown of the copolymer takes place. At the same time undesired splitting-off occurs of carbon dioxide. For this reason the SMA copolymers containing less than 50 moles % maleic anhydride are difficult to process. This decarboxylation decreases as the MA content decreases and is not an impediment with copolymers containing less than 18 moles % maleic anhydride.

It is known per se how to protect SMA copolymers against this thermal breakdown.

In U.S. Pat. No. 3,794,616 organic and inorganic acids of phosphorus, sulphur, boron and silicon are mentioned, which, added to the SMA, protect it against thermal breakdown. The inorganic acids mentioned are sulphuric acid, phosphoric acid, pyrophosphoric acid, boric acid, metaboric acid and silicic acid. The organic acids mentioned are sulphonic acids such as p-toluene sulphonic acid, naphthalenesulphonic acid, methanesulphonic acid, pyridine-sulphonic acid and sulphanilic acid. Another usable group derived from these acids are the esters of sulphuric acid, phosphoric acid, boric acid and silicic acid, such as di(2-ethylhexyl)phosphoric acid, phenylboric acid and diphenylsilicic acid.

A disadvantage of all these compounds is that during the processing the SMA thus protected against decomposition will stick to the processing equipment such as extruders, injection moulding machines and rolls and the processing of SMA-containing moulding compound is thus impeded to a high degree. Moreover, as a result of this, corrosion may occur in the processing equipment in which SMA is processed. Applicant has found that by adding lubricants these phenomena cannot be avoided.

The object of the invention is to obtain a thermoplastic moulding compound based on a copolymer of an alkenyl-aromatic monomer and an unsaturated dicarboxylic anhydride that does not show the said disadvantages.

DESCRIPTION OF THE INVENTION

According to the invention a thermoplastic moulding compound is prepared on the basis of a copolymer of an alkenyl-aromatic monomer and an unsaturated dicarboxylic anhydride characterized in that the moulding compound consists of a mixture of:

A. at least 95% (wt) of a copolymer consisting of:
  1. 50–95 moles % styrene and/or α-methylstyrene,
  2. 50–5 moles % unsaturated dicarboxylic anhydride; and
B. at most 5% (wt) of an phosphite with the general formula of

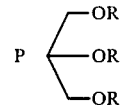

where R represents hydrogen or the residue of an alkyl, cycloalkyl, aryl, alkaryl or aralkyl, while the R substituents need not to be the same and may contain heteroatoms.

These organic phosphites are applied in an efficient amount of 5% (wt) at most, preferably an amount ranging from 0.1% (wt) to 2.0% (wt) is used.

Surprisingly it has been found that addition of these phosphites to SMA-containing moulding compounds not only checks the decomposition of SMA, but also prevents the moulding compound from getting stuck to the processing equipment and consequently reduces corrosion to a high degree.

Examples of inorganic and organic phosphites are compounds such as isooctyldiphenylphosphite, trinonylphenylphosphite, diphenyldecylphosphite, triphenylphosphite, phenyldidecylphosphite, tridodecylphosphite, bis(2,4-di-t-butyl)pentaerythritoldiphosphite, tris-(2,4-di-tert-butylphenyl)phosphite, distearylpentaerythritol-di-phosphite, tetratridecyl-[1,1-bis-(5-tert-butyl-4-hydroxy-2-methylphenyl)-butane]-diphosphite, phosphorous acid, di-stearyl-mono(2-hydroxytriacontanol)-sorbitol-trisphosphite, tris-[2-tert-butyl-4-thio-(2'-methyl-4'-hydroxy-5'-tert-butyl)-phenyl-5-methyl]-phenylphosphite and di-(2,4-di-nonylphenyl)phosphite or mixtures hereof. Preference is given to the use of isooctyldiphenylphosphite, phosphorous acid, trinonylphenyl-phosphite and di-(2,4-dinonylphenyl)-nonylphenylphosphite.

The alkenyl-aromatic monomers that can be used in the process according to the invention are styrene or α-methylstyrene.

The unsaturated dicarboxylic anhydrides that can be used in the process according to the invention, in addition to maleic anhydride, are chloromaleic anhydride, dichloromaleic anhydride, citraconic anhydride, itaconic anhydride, phenylmaleic anhydride, aconitic anhydride and mixtures of these. Preference is given to the use of maleic anhydride.

Moulding compounds prepared according to the invention are suitable for many uses. Thus many articles can be produced from these, such as for instance dashboards for motor cars and boxes and casings for electronic and domestic apparatuses.

The invention is further elucidated by means of the following examples and comparative experiments without being limited thereto.

Examples I up to and including IV and comparative examples a up to and including d To a mixing roll consisting of two rollers with a diameter of 80 mm and a width of 200 mm with a friction of 1:1.2 were added:

100 grammes SMA (MA-content of 18–33%)
1 gramme polyethylene wax (Allied Chem., Grade AC 316).

To these certain amounts of different phosphites were added.

Subsequently the components were mixed on the mixing roll for 10 minutes at a temperature of 200° C. and a speed of 35 rpm.

In these examples the effects of the different phosphites on the amount of $CO_2$ released and the adhesion on the roller were examined.

The phosphites and references applied were as follows.

Ref. 1: phosphoric acid ($H_3PO_4$)
Ref. 2: paratoluenesulphonic acid
Component A: isooctyldiphenylphosphite
Component B: trinonylphenylphosphite
Component C: di-(2,4-dinonylphenyl)-nonylphenylphosphite
Component D: phosphorous acid ($H_3PO_3$).

The results of the experiments are shown in the following table.

TABLE

| Experiment | % (wt) MA in copolymer | Component added | % (wt) calculated on SMA | % (wt) $CO_2$ delivery | adhesion to roller |
|---|---|---|---|---|---|
| a-1 | 18 | — | — | 0.45 | yes |
| a-2 | 18 | Ref. 1 | 0.5 | 0.06 | yes |
| a-3 | 18 | Ref. 2 | 0.2 | 0.08 | yes |
| I-1 | 18 | Component A | 0.5 | 0.08 | no |
| I-2 | 18 | Component B | 0.5 | 0.06 | no |
| I-3 | 18 | Component C | 0.2 | 0.09 | no |
| b-1 | 22 | — | — | 0.63 | yes |
| b-2 | 22 | Ref. 1 | 0.5 | 0.17 | yes |
| II-1 | 22 | Component A | 0.5 | 0.20 | no |
| II-2 | 22 | Component B | 2.0 | 0.11 | no |
| II-3 | 22 | Component C | 0.1 | 0.36 | no |
| II-4 | 22 | Component C | 2.0 | 0.17 | no |
| c-1 | 28 | — | — | 1.10 | yes |
| c-2 | 28 | Ref. 1 | 1.0 | 0.28 | yes |
| c-3 | 28 | Ref. 2 | 1.0 | 0.16 | yes |
| III-1 | 28 | Component A | 0.5 | 0.46 | no |
| III-2 | 28 | Component A | 1.0 | 0.35 | no |
| III-3 | 28 | Component B | 0.5 | 0.68 | no |
| III-4 | 28 | Component B | 1.0 | 0.39 | no |
| III-5 | 28 | Component C | 0.5 | 0.35 | no |
| III-6 | 28 | Component C | 1.0 | 0.29 | no |
| III-7 | 28 | Component D | 0.5 | 0.33 | no |
| d-1 | 33 | — | — | 1.97 | yes |
| d-2 | 33 | Ref. 1 | 0.5 | 0.24 | yes |
| d-3 | 33 | Ref. 2 | 1.0 | 0.21 | yes |
| IV-1 | 33 | Component A | 0.5 | 0.70 | no |
| IV-2 | 33 | Component B | 2.0 | 0.25 | no |
| IV-3 | 33 | Component C | 1.0 | 0.60 | no |

We claim:

1. A thermoplastic molding compound based on a copolymer of an alkenyl-aromatic monomer and an unsaturated dicarboxylic anhydride consisting of a mixture of:
   (a) at least 95% (wt.) of a copolymer consisting of:
      (i) 50–95 moles % styrene and/or α-methyl styrene,
      (ii) 50–5 moles % unsaturated dicarboxylic anhydride; and
   (b) at most 5% (wt.) of isooctyldiphenylphosphite, trinonylphenyl-phosphite, and/or di-(2,4-dinonylphenyl)nonylphenylphosphite.

2. The thermoplastic molding compound according the claim 1 wherein said unsaturated dicarboxylic anhydride is selected from the group consisting of maleic anhydride, chloromaleic anhydride, dichloromaleic anhydride, citriconic anhydride, itoconic anhydride, phenylmaleic anhydride, aconitic anhydride, and mixtures thereof.

3. The thermoplastic molding compound according to claim 2 wherein said unsaturated dicarboxylic anhydride is maleic anhydride.

4. The thermoplastic molding compound according to claim 1, where in isooctyldiphenylphosphite is used.

5. The thermoplastic molding compound according to claim 4 wherein said unsaturated dicarboxylic anhydride is maleic anhydride.

6. The thermoplastic molding compound according to claim 1, wherein said copolymer (a) contains 50–82 mole % styrene and 18–50 moles % maleic anhydride.

7. The thermoplastic molding compound according to claim 1 wherein said thermoplastic molding compound contains 0.1–2.0% (wt.) of said phosphite.

8. The article wholly or partly produced from the molding compound according to claim 1.

9. A thermoplastic molding compound based on a copolymer of an alkenyl-aromatic monomer and an unsaturated dicarboxylic anhydride consisting of a mixture of:
   (a) at least 95% (wt.) of a copolymer consisting of:
      (i) 50–95 moles % styrene and/or α-methyl styrene,
      (ii) 50–55 moles % unsaturated dicarboxylic anhydride;
   (b) at most 5% (wt.) of a phosphite selected from the group consisting of isooctyldiphenylphosphite, trinonylphenylphosphite, diphenyldecylphosphite, triphenylphosphite, phenyldidecylphosphite, tridodecylphosphite, bis(2,4-di-tert-butyl) pentaerythritoldiphosphite, distearylpentaerythritol-diphosphite, tetratridecyl-[1,1-bis(5-tert-butyl-4-hydroxy-2-methylphenyl)-butane]-di-phosphite, phosphorus acid, di-stearyl-mono(2-hydroxy-triacontanol)-sorbitol-tris-phosphite, tris[2-tert-butyl4-thio-(2'-methyl-4'-hydroxy-5'-tertbutyl)-phenyl-5-methyl]-phenylphosphite and di-(2,4-dinonylphenyl)-nonylphenyl phosphite and mixtures thereof.

10. The thermoplastic molding compound according to claim 9 wherein said unsaturated dicarboxylic anhydride is selected from the group consisting of maleic anhydride, chloromaleic anhydride, dichloromaleic anhydride, citriconic anhydride, itoconic anhydride and phenylmaleic anhydride, aconitic anhydride and mixtures thereof.

11. The thermoplastic molding compound according to claim 9 wherein said thermoplastic molding compound contains from 0.1% (wt.) to 2.0% (wt.) of said phosphite.

12. The thermoplastic molding compound according to claim 11 wherein said unsaturated dicarboxylic anhydride maleic anhydride.

13. The thermoplastic molding compound according to claim 9 wherein said phosphite is phosphorous acid.

14. The article wholly or partly produced from the molding compound according to claim 10.

* * * * *